United States Patent
Russell

[11] Patent Number: 5,803,855
[45] Date of Patent: Sep. 8, 1998

[54] POWER TRANSMISSION BELT

[76] Inventor: Jeffrey D. Russell, 345 Lysander, Rochester, Mich. 48307

[21] Appl. No.: 783,505

[22] Filed: Jan. 14, 1997

Related U.S. Application Data

[60] Provisional application No. 60/009,975, Jan. 16, 1996.
[51] Int. Cl.$^6$ ....................................................... F16G 5/00
[52] U.S. Cl. ........................................... 474/238; 474/252
[58] Field of Search .................................... 474/237, 238, 474/249–252, 265

[56] References Cited

U.S. PATENT DOCUMENTS

| | | | |
|---|---|---|---|
| 3,948,113 | 4/1976 | Stork | 474/148 |
| 4,047,446 | 9/1977 | Speer | 474/238 |
| 4,305,713 | 12/1981 | Imamura | 474/238 |
| 4,330,287 | 5/1982 | Fischer | 474/238 |
| 4,904,232 | 2/1990 | Kitahama et al. | 474/238 |
| 4,944,717 | 7/1990 | Georget | 474/238 |
| 5,322,479 | 6/1994 | Le Devehat | 474/265 X |
| 5,364,315 | 11/1994 | Kumazaki | 474/242 |
| 5,492,507 | 2/1996 | Kumazaki | 474/237 X |

*Primary Examiner*—Roger J. Schoeppel

[57] ABSTRACT

This invention relates to power transmission belts having multiple longitudinally extending ribs, and particularly, to an improved belt with a cross sectional profile that includes a clearance space that connects adjacent ribs, curved opposing surfaces in the pulley contact area, and a curved rib apex. The inventive belts cross sectional profile design maximizes the performance of each region of the rib profile. The invention separates the rib profile design into three critical areas: the belts rib\pulley contact surfaces; the clearance space that connects adjacent ribs and separates the pulley apex from the root of the rib; and the belt rib apex. The improved power transmission belt overcomes piling and noise problems associated with previous belt designs.

19 Claims, 2 Drawing Sheets

POWER TRANSMISSION BELT

BACKGROUND OF THE INVENTION

This application claims benefit of Provisional application No. 60/009,975, filed Jan 16, 1995.

1. Technical Field

A wide range of applications use multi-ribbed V belts to transfer power through various arrangements of drive and driven pulley systems. This invention relates to power transmission belts having multiple longitudinally extending ribs, and particularly, to an improved belt with a cross sectional profile that includes a clearance space that connects adjacent ribs, curved opposing surfaces in the pulley contact area, and a curved rib apex.

2. Background Art

It is desirable for power transmission belts to transfer power through pulley systems without generating noise in the drive system. Noise is generated in a power transmission drive system when the belt slips in contact with the pulley. Belt slip noise can be caused by problems such as misalignment of the belt profile with the pulley profile, and the presence of materials such as belt piling, water, or road dirt, which interferes with the belt pulley contact surfaces.

One problem with multi-ribbed V belts is the belt slip noise generated in a power transmission drive system caused by misalignment of the belt profile with the pulley profile. One method to reduce belt slip noise is to improve the ability of the belt ribs profile to contact the pulley as disclosed by Kumazaki in U.S. Pat. No. 5,364,315 and Fischer in U.S. Pat. No. 4,330,287.

Another problem with multi-ribbed V belts is the belt slip noise generated in a power transmission drive system caused by the presence of debris such as piling of worn belt rubber, water, road dirt and sand which interfere with the belt pulley contact surfaces It is also desirable for power transmission belts to transfer power through pulley systems over an extended period of time.

A problem that affects the operating life of multi-ribbed belts is the contact of the pulley apex and the rib root area at the inside of the belt. As the multi-ribbed belt wears the pulley apex may contact the belt rib root producing high load concentrations resulting in excessive heat, noise, and finally belt failure. Examples of solutions to the problem of contact between the pulley apex and the belt rib root are disclosed by: Stork in U.S. Pat. No. 3,948,113; Speer in U.S. Pat. No. 5,364,315; and Imamura in U.S. Pat. No. 4,305,713.

Another problem that affects the operating life of multi-ribbed belts is the propagation of cracks from stress concentrations located at the outer edge or apex of the rib. A solution to the stress concentrations in the rib apex area is disclosed by Georget in U.S. Pat. No. 5,364,315.

DISCLOSURE OF INVENTION

An improved power transmission belt the belt comprising: A load carrying tension section with a plurality of ribs extending longitudinally from the load carrying tension section. The ribs having a cross sectional profile defined by opposing pulley contact surfaces, a portion of the opposing pulley contact surfaces being non-linear, and a clearance space connecting adjacent ribs defined by side surfaces connecting the pulley contact surfaces of the adjacent ribs to a third surface connecting the side surfaces.

The present invention provides a multi-ribbed V belt that overcomes the previously mentioned noise problems through a novel belt cross sectional profile.

The improved power transmission belt solves the previously mentioned belt slip noise problems by eliminating piling and debris from the belt pulley contact surfaces through the use of clearance spaces between adjacent ribs and improving belt pulley contact through the use of non-linear pulley contact surfaces.

The improved power transmission belt increases belt service life by reducing stress concentrations an the belt apex area, which reduces stress cracking of the ribs, and the clearance space delays the contact of the pulley apex and the rib root that connects adjacent ribs.

The inventive belts cross sectional profile design maximizes the performance of each region of the rib profile. The invention separates the rib profile design into three critical areas: the belts rib\pulley contact surfaces; the clearance space that separates the pulley apex from the root of the rib; and the belt rib apex.

The present invention provides a multi-ribbed V belt with opposing pulley contact surfaces having curved opposing surfaces in the pulley contact area. Circular, elliptical, or another non linear shapes form these curved opposing surfaces. In belt designs with linear opposing pulley contact surfaces belt rib angles decrease significantly as pulley radius decreases causing slip noise at the belt pulley interface. The nonlinear drive surfaces allow the rib to maintain a nearly constant angle as the belt is entrained around a wide range of pulley diameters. The belt ribs nonlinear pulley contact surface provides improved contact of the belt drive surface with a wide range of pulley diameters.

The present invention provides a multi-ribbed V belt with clearance spaces that join the opposing nonlinear drive surfaces of the belt. The clearance spaces extend above the opposing drive surfaces with two side surfaces connected at the top of the space by either a non linear curvature, or a linear flat. The clearance space eliminates worn rubber piling, and removes road debris, and water from the belt and pulley drive contact area. This reduction of foreign materials in the pulley belt contact area reduces noise improving belt performance. The clearance space also provides for extended belt life by eliminating possible interference between the pulley apex and the root of the rib on the belt as the belt wears through its service life.

The present invention provides a radius on the apex of the rib. The rib apex radius blends into the nonlinear section of the rib pulley contact area. The radius on the apex reduces stress concentrations where the pulley contact area joins the apex of the rib. This stress reduction reduces the propagation of cracks through the rib towards the rib root enhancing the life of the belt.

BRIEF DESCRIPTION OF DRAWINGS

These and other advantages of the invention will be apparent after reviewing the drawings and descriptions thereof wherein.

DETAILED DESCRIPTION OF THE DRAWINGS

Figure 1:
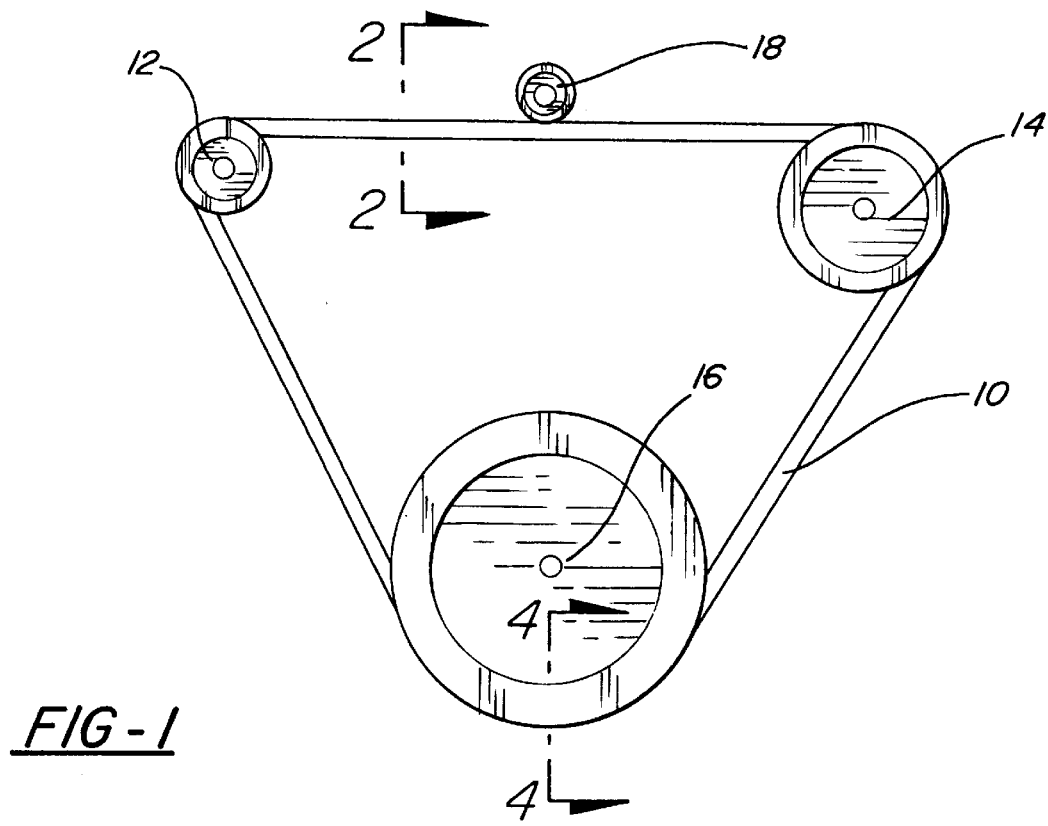
FIG. 1 is a view of one example of the inventive belt utilized in a power transmission drive system. The example includes a driving pulley, two driven pulleys, and a tensioning roller device.

In FIG. 1 the inventive power transmission belt 10 is entrained around the drive pulley 16, two driven pulleys of different diameters 12, and 14, and tensioned by the idler 18.

Figure 2:
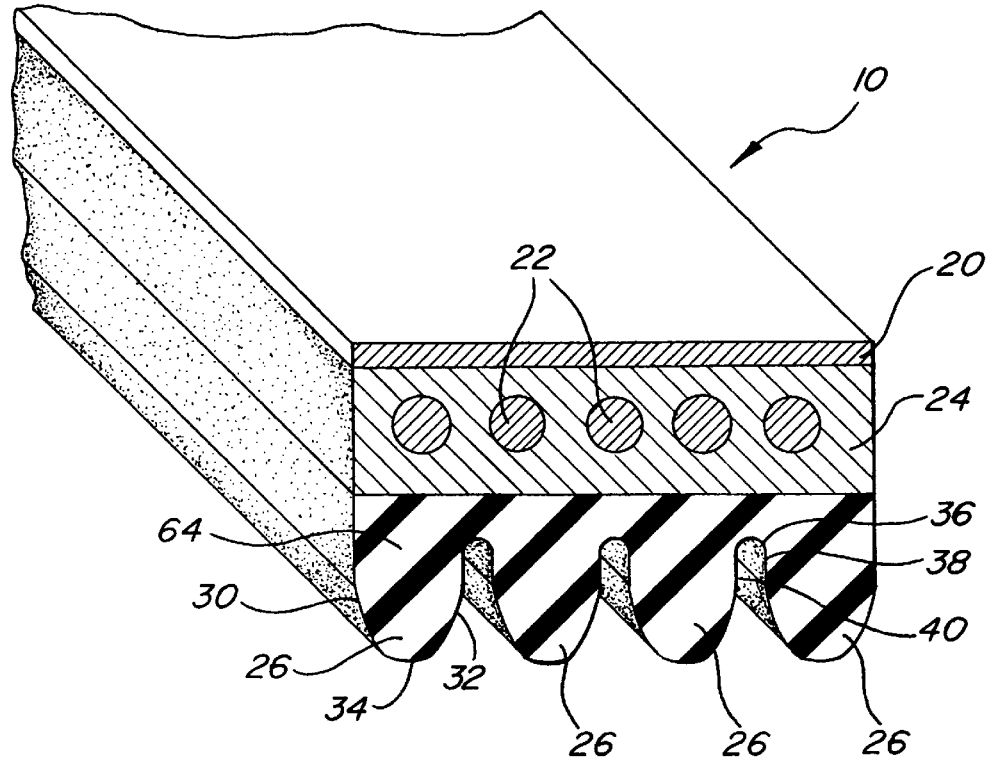
FIG. 2 is an enlarged cross sectional view taken essentially on the line 1—1 of FIG. 1.

FIG. 2 is an enlarged cross sectional view of the inventive power transmission belt 10 taken essentially on the line 1—1 of FIG. 1. The belt is fabricated by techniques known in the art and has load carrying tensile members 22 located in the load carrying tension section 24 of the belt. These tensile members formed of any suitable material exhibiting good tensile strength without elongation such as cotton, rayon, nylon, polyester, aramid, or steel. The top of the belt is covered by one or more layers of coated textiles 20. The top portion 24, and rib portions 26 of the belt may be constructed of any suitable elastomeric material including natural and synthetic rubbers, EPDM, or polyurethane. The rib sections 26 of the belt may also contain fiber 64 loading dispersed laterally. These fibers 64 may consist of polyester, cotton, aramid, or other suitable organic or inorganic materials. The belt 10 is shown with four ribs for illustrative purposes only, any number of ribs are contemplated in the present invention. The multi ribs of the belt may be formed by known methods such as molding, cutting, or grinding.

Figure 3:
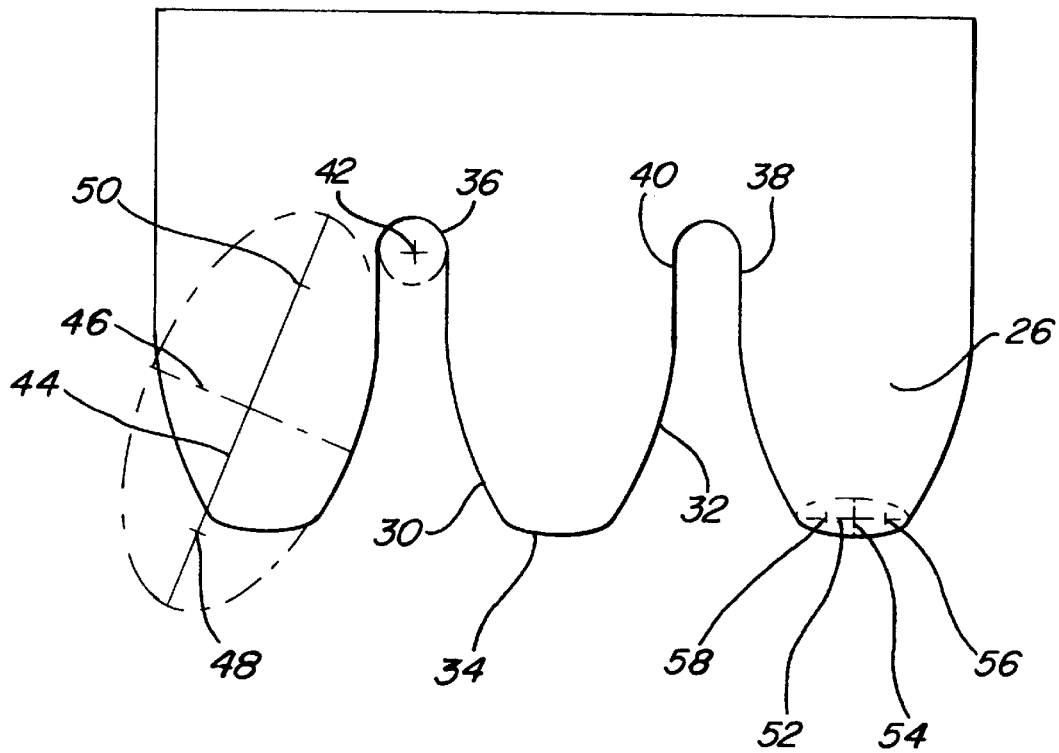
FIG. 3 is an enlarged view similar to FIG. 2 illustrating one possible arrangement of the curved elements of the design of the inventive belt.

In FIG. 3 is an enlarged cross sectional view of one possible arrangement of the curved design elements of the rib sections 26. The rib sections 26 are formed by curved nonlinear opposing pulley contact surfaces. The opposing surfaces are defined by arcs of circular, elliptical, or another non linear shapes 30, 32. In the preferred embodiment the opposing rib surfaces 30, 32 are formed by radii. It is contemplated the opposing surfaces 30, 32 may be defined by radii with centers located inside or outside the rib 26. For the purposes of illustration the opposing surfaces 30, 32 are shown as sections of ellipses. In FIG. 3 the ellipse defining the opposing surfaces 30, 32 have their major axis 44 approximately parallel to the corresponding pulley design angle. In FIG. 3 defining ellipses 30, 32 have one locus 50 located inside the rib 26, and one locus 48 outside the rib 26. There are three possible locations for the loci 48, 50 of the ellipses 30, 32 depending on the relationship of the major axis 44 and minor axis 46. It is contemplated that the loci 48, 50 of ellipse 30, 32 may both be located inside the rib 26, or one of the loci 50 or 48 may be located inside the rib 26 with the other loci 50 or 48 located outside the rib 26, or both loci 48, 50 may be located outside the rib 26. The curved drive surfaces 30, 32 allow the rib 26 to maintain a nearly constant angle as the belt 10 is entrained around a wide range of pulley diameters.

Figure 4:
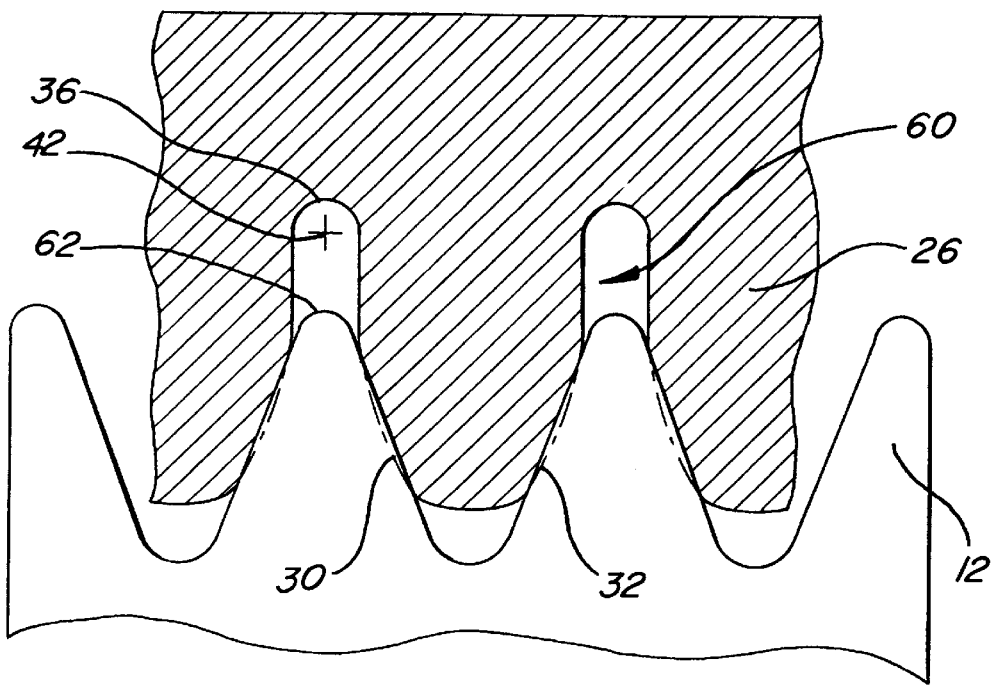
FIG. 4 is an enlarged cross sectional view taken essentially on the line 2—2 of FIG. 1 showing one possible arrangement of the curved elements of the inventive belt and its relationship to a pulley.

In FIG. 4 the elliptical curved opposing surfaces 30, 32 of adjacent ribs 26 are joined by a clearance space 60. The clearance space 60 is formed by two side surfaces 38, 40 that extend above the curvature of the opposing drive surfaces 30, 32 and are connected by a top surface 36. For illustrative purposes FIG. 4 shows the clearance space 60 as two side surfaces 38, 40 formed by linear parallel lines and a top surface 36 formed by a radius with center 42. It is contemplated the top surface 36 may be formed by either a non linear curvature 36, or a linear flat 36. It is contemplated the two side surfaces 38, 40 may be formed by parallel or converging lines or a nonlinear curvature. The design of the two side surfaces 38, 40 of the clearance spaces allows the radius 36 connecting the ribs 26 to be larger than previous designs. FIG. 4 illustrates an example of the inventive rib 26 and clearance space 60 in relation to a driven pulley 12. Previous designs have relied on the difference between the pulley radius 62 and the rib root radius 36 to provide clearance 60 between the top of the belt and the pulley apex. The increased clearance 60 created by the spaces enhances the ability of the belt to remove foreign material from the pulley drive area. The larger apex radii 36 also enhances the ability to manufacture the belt. The preferred embodiment of the clearance space has a connecting radius 36 equal approximately to the pulley apex radii.

The apex 34 of the rib 26 may be defined by arcs of circular, elliptical, or another non linear shapes. For purposes of illustration FIG. 3 shows the rib apex surfaces 34 formed by an ellipse with both loci 56, 58 located inside the rib 26. The ellipses major axis 52 is approximately parallel and the ellipses minor axis 54 is approximately perpendicular to the plane formed by the top of the belt. In the preferred embodiment the rib apex surfaces 34 is formed by arc of a circle centered inside the belt. The curvature 34 blends into the opposing rib surfaces 30, 32 reducing stress concentrations in a critical wear area of the belt. The reduction of stress concentrations in this area increases the service life of the belt.

BEST MODE FOR CARRYING OUT THE INVENTION

In the preferred embodiment the opposing rib surfaces 30, 32 are formed by radii. In the preferred embodiment the clearance space has two side surfaces 38, 40 formed by parallel lines and a connecting radius 36 equal approximately to the pulley apex radii. In the preferred embodiment the rib apex surfaces 34 is formed by arc of a circle centered inside the belt.

The foregoing disclosure of specific embodiments is intended for illustrative purposes and it will be apparent to those skilled in the art that various changes and modifications can be made therein without departing the invention.

I claim:

1. An improved power transmission belt said belt comprising: a load carrying tension section with a plurality of ribs extending longitudinally from said load carrying tension section, each of said ribs having a cross sectional profile defined by opposing pulley contact surfaces, a portion of said opposing pulley contact surfaces having a non-linear profile, each of said opposing pulley contact surfaces of adjacent ribs including a clearance surface extending upwardly therefrom toward said load carrying tension section to a top portion, said clearance surfaces having a profile different than the profile of said opposing pulley contact surface; and a third surface connecting each of said top portions of said clearance surfaces of adjacent ribs, said third surface extending generally transverse to said clearance surfaces of adjacent ribs, said clearance surfaces of adjacent ribs and said third surface defining a clearance space between adjacent ribs.

2. A belt as set forth in claim 1 in which said non linear profile of said opposing pulley contact surfaces is approximated by an arc of radius centered inside said rib.

3. A belt as set forth in claim 1 in which said non linear profile of said opposing pulley contact surfaces is approximated by an arc of radius centered outside said rib.

4. A belt as set forth in claim 1 in which said non linear profile of said opposing pulley contact surfaces is approximated by an ellipse with both loci located inside said rib.

5. A belt as set forth in claim 1 in which said non linear profile of said opposing pulley contact surfaces is approximated by an ellipse with one loci located inside said rib and one loci located outside said rib.

6. A belt as set forth in claim 1 in which said non linear profile of said opposing pulley contact surfaces is approximated by an ellipse with both loci located outside said rib.

7. A belt as set forth in claim 1 in which said clearance surfaces of adjacent ribs are approximated by two parallel lines.

8. A belt as set forth in claim 1 in which said clearance surfaces of adjacent ribs are approximated by two converging lines.

9. A belt as set forth in claim 1 in which said clearance surfaces of adjacent ribs are approximated by a non linear curvature.

10. A belt as set forth in claim 1 in which said third surface is approximated by a non linear curvature between said top portions of said clearance surfaces of adjacent ribs.

11. A belt as set forth in claim 1 in which said third surface is approximated by a linear surface between said top portions of said clearance surfaces of adjacent ribs.

12. A belt as set forth in claim 1 in which a portion of the longitudinally extending ribs' apex is approximated by a line.

13. A belt as set forth in claim 1 in which a portion of the longitudinally extending ribs' apex is approximated by a non linear surface.

14. A belt as set forth in claim 13 in which a portion of said longitudinally extending ribs' apex is approximated by an arc of radius centered outside said rib.

15. A belt as set forth in claim 13 in which a portion of said longitudinally extending ribs' apex is approximated by multiple arcs of radii centered outside said rib.

16. A belt as set forth in claim 13 in which a portion of said longitudinally extending ribs' apex is approximated by an arc of radius centered inside said rib.

17. A belt as set forth in claim 13 in which a portion of said longitudinally extending ribs' apex is approximated by multiple arcs of radii centered inside said rib.

18. A belt as set forth in claim 13 in which a portion of said longitudinally extending ribs' apex is approximated by an ellipse with both loci located inside said rib.

19. A belt as set forth in claim 13 in which a portion of said longitudinally extending ribs' apex is approximated by an ellipse with both loci located outside said rib.

* * * * *